United States Patent [19]

Steciuk et al.

[11] Patent Number: 5,387,821
[45] Date of Patent: Feb. 7, 1995

[54] POWER DISTRIBUTION CIRCUIT WITH POWER FACTOR CORRECTION AND INDEPENDENT HARMONIC CURRENT FILTER

[75] Inventors: Paul B. Steciuk, Troy, N.Y.; Frank W. Smith, Williamstown; Carol A. Lupo, Adams, both of Mass.

[73] Assignee: Allegro Microsystems, Inc., Worcester, Mass.

[21] Appl. No.: 974,965

[22] Filed: Nov. 12, 1992

[51] Int. Cl.⁶ ............................................. H02J 3/00
[52] U.S. Cl. ................................. 307/105; 333/176; 333/181
[58] Field of Search ............... 323/208; 333/175, 176, 333/181; 361/113; 307/105

[56] References Cited

U.S. PATENT DOCUMENTS

| | | | |
|---|---|---|---|
| 3,881,137 | 4/1975 | Thanawala | 307/105 |
| 4,551,780 | 11/1985 | Canay | 361/113 |
| 4,724,333 | 2/1988 | Hedin | 307/105 |
| 4,808,843 | 2/1989 | Hedin | 307/105 |
| 4,939,486 | 7/1990 | Bergdahl et al. | 307/105 |
| 5,051,605 | 9/1991 | Sink | 323/208 |
| 5,105,327 | 4/1992 | Wohlforth | 361/174 |
| 5,262,677 | 11/1993 | Ramirez | 307/105 |

OTHER PUBLICATIONS

Unipak Filter Harmonic Filtering/Power Factor Correction Banks, published by Commonwealth Sprague Capacitor, Inc. Feb. 1992.

Harmonic Filtering/A Guide for the Plant Engineer, Published by Commonwealth Sprague, Inc. Mar. 1991.

Primary Examiner—Jeffrey A. Gaffin

[57] ABSTRACT

An electrical power distribution system of an industrial plant or a commercial building and having a capacity for delivering at least 500 KVA, includes a voltage step-down transformer connected between an AC source of electrical energy and a pair of power distribution line conductors across which there is connected a pulsed inductive load, such as a motor with a thyrister speed controller. The power factor of the system is corrected by a power factor correction capacitor connected directly across the system power distribution line conductors. Pulsed inductive loads tend to excite large harmonic currents in such systems having both a transformer and a power factor correction capacitor directly across the distribution line conductors. A filter, made up of a filter capacitor and a filter inductor tuned exactly to one harmonic, are connected in a series circuit branch that is connected directly across the system power distribution line conductors. The name plate KVAR rating of and capacitance of the filter capacitor is chosen to be much smaller than corresponding KVAR rating and capacitance of the power factor correction capacitor in order to make the function of the power factor correction capacitor and the function of the filter essentially independent of each other. This independence is attributable to the substantially no current flow of frequency of the AC power source through the filter capacitor and substantially no current at the harmonic frequency to which the filter is tuned flows through the power factor capacitor.

10 Claims, 4 Drawing Sheets

POWER DISTRIBUTION CIRCUIT WITH POWER FACTOR CORRECTION AND INDEPENDENT HARMONIC CURRENT FILTER

BACKGROUND

This invention relates to an industrial-plant or commercial-building electrical power distribution circuit for connecting pulsed inductive loads to an AC source of electrical energy with a power factor correction capacitor or capacitors, and more particularly pertains to such a circuit having a harmonic filter for shunting non-linear-load generated harmonic currents away from the source of electrical energy without affecting the degree of power factor correction.

Figure 1:
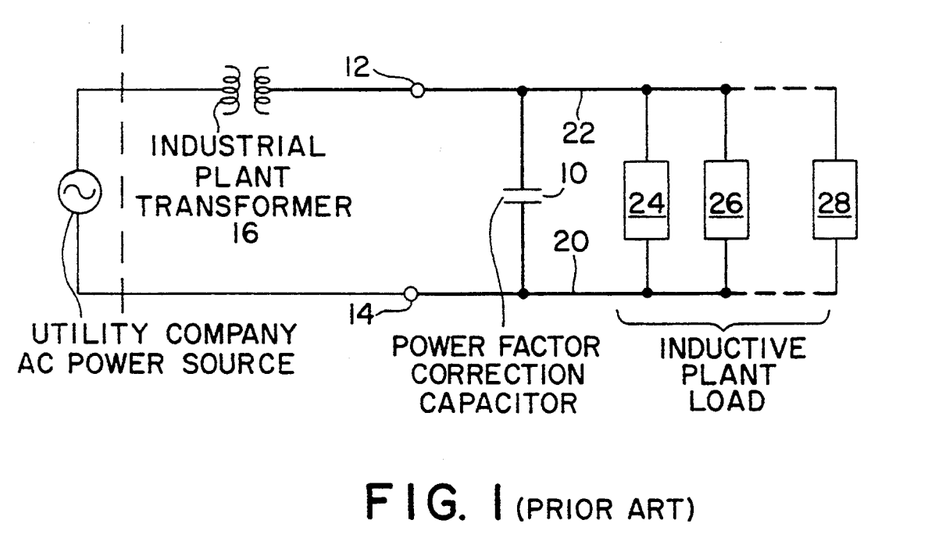
FIG. 1 shows an electrical power distribution system, with power factor correction, of th prior art.

It is well known to connect, as illustrated in FIG. 1, a power factor correction capacitor 10 across a pair of power distribution lines 22 and 20 that supply electrical energy from a sinusoidal AC energy or power source to an inductive load. The inductive load may be a single load or as shown here a composite load made up of the loads 24, 26 and 28 such as motors, fluorescent lighting with inductive ballasts, and solenoids. The voltage supplied to an industrial plant from a utility company AC power source is usually reduced by a step-down transformer 16 having output terminals 12 and 14 to which the plant power distribution lines or conductors 20 and 22 are connected.

The power factor, PF, of a distribution circuit as viewed at terminals 12 and 14 (and as essentially seen by the power company) is $$PF = \frac{KW}{KVA}$$

which is equal in turn to the cosine of the angle by which the line current (e.g. at terminal 16) lags the line voltage across terminals 12 and 14. KW (kilowatts) stands for the real power consumed by the resistive portion of the load whereas KVA (kilovolt-amps) is the product of the in-phase current and AC line voltage supplied by the transformer 16 to distribution lines 22 and 20. The transformer 16 is conservatively rated in KVAs to deliver a somewhat greater power than the actual plant load. As the capacitance of a power factor capacitor increases the more the leading current flows tending to increase the power factor. At a power factor of exactly 1.00 no leading or lagging current is supplied by the AC source.

Power factor correction capacitors are sometimes rated for given line voltage in KVAR's, i.e. the product of the rated line voltage at terminals 12 and 14, and the leading reactive current that flows through the capacitor 10. Thus the KVAR rating of a power factor correction capacitor is $$KVAR = \frac{(2\pi f)C(KV)^2}{10^3}$$

where f is the frequency of the source voltage and C is the capacitance of the power factor capacitor.

As used herein, the name plate KVAR rating of a capacitor, as determined by the formula given above wherein f is the name plate frequency of the AC energy source, C is the name plate capacitance, and KV is the name plate service voltage at which the capacitor is intended to operate.

Electrical power engineers often speak of a power factor correction capacitor as a "reactive leading current generator" or a "KVAR generator". It follows from the above that when the service voltage rating and the KVAR rating of a power factor correction capacitor are known, then so is the maximum safe current ($I_m$) rating of the capacitor known:

$$\text{rated } I_m = \frac{\text{rated } KVAR}{\text{rated } KV}.$$

It is often preferable to connect a separate power factor correction capacitor (not shown) across the distribution line physically adjacent to each inductive load thus correcting the power factor right at each load. To obtain the same power factor as seen at the terminals of the AC energy source, all the individual-load power factor correction capacitors taken together will provide the same total leading KVAR's as the single power factor correction capacitor 10 in FIG. 1.

In recent years, the increasing use of semiconductor circuit industrial motor controllers presents to the power line a nonlinear impedance. Such nonlinear loads trigger and sustain large harmonic currents in the power distribution system with a power factor correction capacitor at one or more odd multiples of the AC power line frequency. This is true because the power factor correction capacitor and inductance of the AC source, including the step-down transformer, are connected mutually in parallel, tend to be broadly resonant, and exhibit a high impedance, at a frequency in the range of from the 5th to the 13th harmonic of the AC line frequency.

For example in a three phase distribution system a "six-pulse" motor controller generates a large 5th harmonic current and a not quite so large a 7th harmonic current. The more refined "twelve-pulse" motor controller or AC to DC converter load produces a strong 11th harmonic current and not quite so strong a 13th harmonic current. Such harmonic currents raise the total current in the distribution conductors, causing IR drops, distorting the line voltage, blowing fuses and/or throwing circuit breakers, and causing deleterious heating of the plant step-down transformer. Among further disadvantageous consequences are costly plant down time unless heavier distribution conductors, and transformers of higher KVA rating are provided. More leading current yet will of course reduce the power factor again to less than unity.

The conventional solution to this problem has become the substitution for the power factor correction capacitor 10 of FIG. 1 by a combination of a power factor correction capacitor in series with an inductor whereby this series branch circuit serves both to shunt the dominant harmonic current away from the AC energy source and at the lower frequency, namely that of the AC power source, to correct the power factor of the distribution system. However it has not proved practical to make the resonant frequency of that series tuned circuit exactly the frequency of the dominant harmonic because the capacitor must carry all of the power factor correction current at the AC source frequency and all of the higher-frequency harmonic current generated by the non-linear load.

Figure 2:
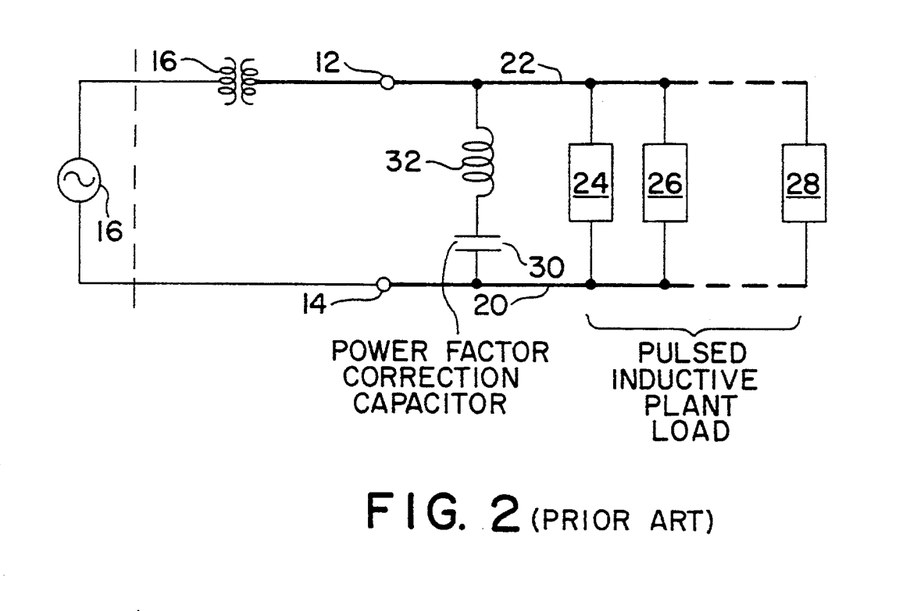
FIG. 2 shows an electrical power distribution system, with power factor correction and harmonic current filtering, of the prior art.

In this power distribution circuit shown in FIG. 2, all of the elements are the same as those in the power distribution circuit of FIG. 1 except that the power factor capacitor 10 of FIG. 1 is replaced by a power factor correction capacitor 30 connected in series with an inductor 32. The values of inductance and capacitance of the series circuit capacitor 30 and inductor 32 are resonant at near the 5th harmonic frequency of the AC power source, namely at 300 HZ when the AC line frequency is 60 Hz. The impedance of this series LC circuit is low at the frequency near its resonant frequency and is strongly leading reactive, i.e. capacitive, at the frequency of the AC power source. The impedance of this series circuit is relatively high at the lower frequency of the AC energy source and the capacitor 30 generates the KVARS needed to raise the power factor toward unity while at the dominant harmonic of the AC source frequency this series LC circuit acts to shunt essentially all of the harmonic current generated by non-linearities in the load 24, 26, and/or 28 away from the AC power source.

When the capacitor 30 and the inductor 32 are made resonant exactly at the dominant harmonic, the total current through capacitor 30 and inductor 32 is at a maximum and the KVAR rating, especially the current rating, of each must be many times greater than that of the capacitor 10 in FIG. 1 which they replaced.

It follows that the power factor correction capacitor 30 must be significantly larger and more expensive than capacitor 10 in FIG. 1 especially to carry both the harmonic current in addition to the leading current at the frequency of the AC power source. Capacitor 30 must be larger still because at the frequency of the AC power source the series inductance (inductor 32) produces some lagging current itself, and because the inductor 32 causes the capacitor voltage to be much greater than the line voltage. In fact capacitor 30 in the exactly series harmonic tuned LC circuit must be many times more expensive than the power factor correction capacitor 10 that it replaced.

Power factor correction capacitors for use in the circuits of FIGS. 1 and 2 have been manufactured and their performance to cost ratio continuously improved over a period of more than fifty years and are today a commodity readily available to plant engineers from many manufacturers with the most commonly used plant voltage ratings, e.g. 240, 480, and 600 volts, and with a wide range of available KVAR ratings. These capacitors are required to meet the current ANSI Standard No. 18 and the IEEE Standard for Shunt Power Capacitors and typically consist of many rolled capacitor sections connected in parallel, each section having metallized plastic film electrodes and a plastic dielectric sheet. The parallel connected rolled sections are surrounded by a casing and impregnated by a dielectric liquid that enhances capacitance and raises the safe operating voltage. But these commercial capacitors are all limited in current to about 100% of that which corresponds to its name plate KVAR rating (at AC source frequency). Capacitors of a different construction are manufactured for use as SCR commutating capacitors that provide a much higher current carrying capacity. These high rated current capacitors employ metal foil electrodes and have a stable capacitance in service. Such a capacitor could have been used in the series circuit of FIG. 2 permitting tuning to exactly the dominant harmonic, but only at a very much greater expense, e.g. $100,000 rather than $25,000 for a capacitor rated at 800 KVAR at 60 HZ.

It is therefore conventional practice to employ the less costly metallized film capacitor with a more modest current carrying capacity, and to detune the series LC circuit of FIG. 2 to a frequency lower than that of the harmonic current to be shunted away from the power source. Another reason for detuning is that the lower cost standard power-factor-correction capacitor described above has a self healing feature whereby when voltage breakdown occurs at a weak point in the plastic dielectric, the metallized film in an area surrounding the fault is vaporized thus clearing the fault; but each such breakdown and healing point causes a gradual reduction in time in the total capacity and thus a detuning in the filter of FIG. 2.

An example of what is done in practice when the fifth harmonic is to be shunted by the series LC circuit of FIG. 2, is to make the resonant frequency of the LC series circuit 4.7 times, instead of exactly 5 times, the frequency of the AC energy source, substantially reducing the harmonic current through the capacitor to the available capacitor rating but at the same time substantially reducing the efficacy of the harmonic shunt.

It is therefore an object of the present invention to provide a lower cost electrical power distribution circuit, with a power factor correction capacitor and means for harmonic current suppression that overcomes the above-noted shortcomings of the prior art.

It is further an object of this invention to provide such an electrical power distribution circuit having greater harmonic current filtering efficiency.

SUMMARY OF THE INVENTION

An electrical power distribution system of an industrial plant or a commercial building connects a pulsed inductive load to an AC source of electrical energy. A source of AC electrical energy, e.g. an electrical utility company, has a line frequency less than 62 Hz, especially including the major world standard power frequencies of 50 Hz and 60 Hz. The distribution system additionally includes a voltage step-down transformer rated for service at greater than 500 KVA. At least two power conductors are connected to two output terminals of the step-down transformer and a pulsed inductive load is connected between the two power conductors. A group of power-factor-correction capacitors is connected directly across the two power conductors; and the group may consist of only one capacitor, or a separate one of the group may be connected respectively to each inductive load. A first filter, comprised of one filter inductor and one filter capacitor connected in series across the two power conductors, and the resonant frequency of the first filter is about exactly, i.e. within 2%, of the harmonic of the AC source frequency.

The harmonic frequency at which large currents are generated in the distribution system, are almost always the odd harmonics within the range of the fifth through the thirteenth harmonic of the AC source frequency. So one filter is made resonant at one such harmonic frequency and each additional filter is made resonant at a different harmonic frequency.

A harmonic filter of this invention employs a capacitor that requires even more current carrying capacity than that of the power factor correction capacitor of the prior art that it replaces, to accomodate all the harmonic current at the frequency to which the filter is exactly tuned.

The filter capacitor of this invention has a many times smaller capacitance than that of the power factor correction capacitor and thus a comparatively high reactance to currents at the AC source frequency, so that the filter capacitor carries substantially no power factor (90° leading) current, yet the filter being tuned exactly to the harmonic carries substantially all of the current at that harmonic frequency.

The components necessary to make power distribution circuit of this invention have been available for at least two decades. This invention recognizes that the cost per KVAR of the high current carrying filter capacitor of the invention is greater than that of a low cost commercially available power factor correction capacitor, but that the cost per current carrying capacity is significantly less so that the overall cost of the combination of low cost power factor correction capacitor plus exactly tuned filter of this invention is less than for the prior art off-tuned dual purpose power-factor-correction series-filter circuit.

Thus, a major advantage of the power distribution system of this invention is that the filter capacitor may be chosen to have a name plate KVAR rating that is less than ten percent of the KVA rating of the step-down transformer. A further advantageous consequence of using the power distribution system of this invention is that the safe KVAR carrying capacity of the filter capacitor at the harmonic frequency to which the filter is resonant, is more than 300% greater than the name plate KVAR rating of that filter capacitor. And, since a harmonic filter of this invention contributes substantially no power factor correction itself to the system, a further advantage is that any number of filters resonant at different harmonics can be employed across the power distribution conductors taking out the different harmonics generated by different pulsed inductive loads that may make up the total system load. Finally, the efficiency by which harmonics are shunted away from the step-down transformer and the electric utility power source in the distribution system of this invention is much greater than in the prior art industrial/commercial power distribution systems.

DESCRIPTION OF THE PREFERRED EMBODIMENTS

Figure 3:
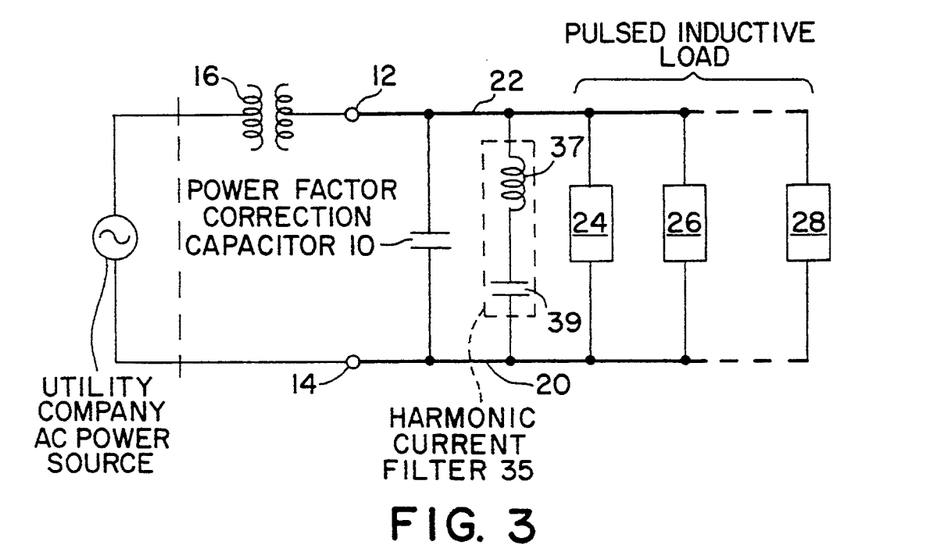
FIG. 3 shows a first embodiment of an electrical power distribution system of this invention with power factor correction and harmonic current filtering.

FIG. 3 shows an electric power distribution system of an industrial plant or commercial building with loads including pulsed inductive loads to which electrical power is supplied, e.g. from an electrical power utility company at 50 or 60 hertz (Hz). The voltage supplied to an industrial plant from a utility company AC power source is reduced by a step-down transformer 16 having output terminals 12 and 14 to which the plant power distribution lines or conductors 20 and 22 are connected. The industrial/commercial AC power distribution system shown in FIG. 3 is meant to be representative of medium to large systems in which the voltage step-down transformer 16 is large enough to supply at least 500 KVA of AC power to the system loads. A power factor correction capacitor 10 is connected across a pair of power distribution lines 20 and 22 that supply electrical energy from a sinusoidal AC energy source to an inductive load.

The inductive load may be a single load or as shown here a composite load made up of the loads 24, 26 and 28 representative of inductive loads such as fluorescent lighting with inductive ballasts, solenoids and motors at least some of which are energized via pulsed controllers. Loads 24–28 may also include resistive loads such as heaters.

As noted earlier herein, such pulsed inductive loads present to the AC power lines 20 and 22 a highly non-linear impedance tending to stimulate large currents, that are odd harmonics of the AC power source frequency, to circulate in the power factor correction capacitor 10 and the parallel connected secondary of the step-down transformer 16. This stems from the fact that the capacitor 10 and transformer 16 are always broadly resonant at or near at least one harmonic of the AC power line frequency.

A harmonic current filter 35, comprised of a series connected filter inductor 37 and a filter capacitor 39, is connected across the power distribution conductors 20 and 22. Filter inductor 37 and filter capacitor 37 have an inductance and capacitance respectively that is exactly resonant with a harmonic of the AC power source frequency for presenting a low impedance shunting away from the transformer 16 and the power factor capacitor 10 the large harmonic current. Thus when in a prior art power distribution system without pulsed inductive loads as in FIG. 1, it is desired to add a pulsed inductive load, a filter 35 as shown in FIG. 3 may be added also to eliminate the dangers of high harmonic currents in the power factor correction filter and the step-down transformer 16.

Figure 4:
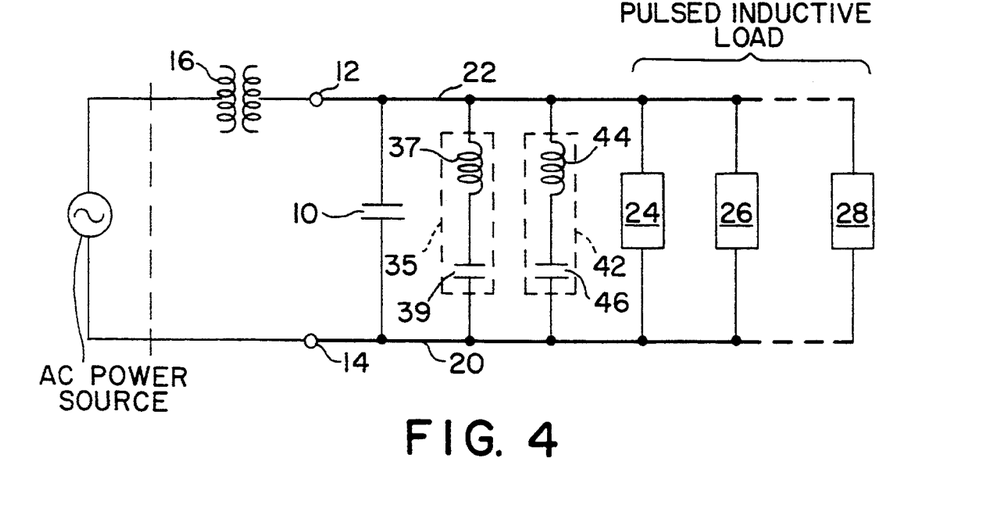
FIG. 4 shows a second embodiment of an electrical power distribution system of this invention with power factor correction and harmonic current filtering.

The filter capacitor 39 of FIG. 3 need not provide any power factor correction KVAR's, unlike for capacitor 30 which must provide it all in the system of FIG. 2. The prior art distribution system of FIG. 2 requires that capacitor 10 be large enough to supply all of the needed KVAR's for power factor correction. After the size of capacitor 30 of FIG. 2 is determined based upon the amount of power factor correction necessary for the anticipated load, then the inductor 32 is sized to resonate with power factor correction capacitor 30 at the harmonic frequency. On the other hand, in the system of FIG. 3, the relative sizes of the filter capacitor 39 and filter inductor 37 may be chosen for resonating at the harmonic frequency (using $f_h = 1/LC$) but with the freedom to choose a low value capacitor toward greatly down scaling its capacitance relative to that of the power factor correction capacitor 10. This leads to a value of capacitance and name plate KVAR rating for filter capacitor 39 that is many times smaller than that of the prior art capacitor 30 of FIG. 2. 5 When a distribution system such as that of FIG. 3 exhibits a second harmonic current high enough to threaten the blowing of fuses, to overheat the transformer, etc., then the system of FIG. 3 may be modified as shown in FIG. 4 by connecting across the power distribution lines 20 and 22 a second filter 42 comprised of filter inductor 44 and filter capacitor 46.

Figure 5:
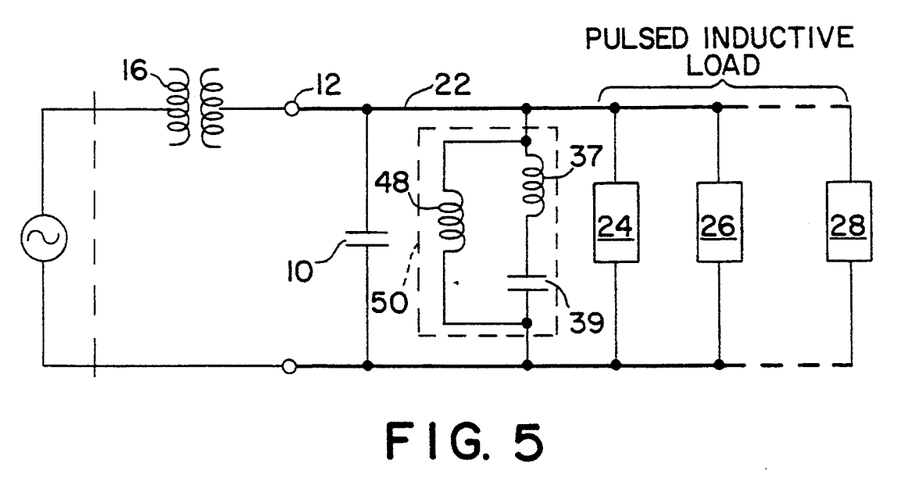
FIG. 5 shows a third embodiment of an electrical power distribution system of this invention with power factor correction an harmonic current filtering.

A filter such as filter 35 as shown in FIG. 3 has an essentially zero impedance at the harmonic frequency at which it resonates, and its impedance increases for lower and lower frequencies approaching an essentially infinite frequency at zero frequency. However its impedance at the low AC power source frequency is finite and is essentially altogether a capacitive reactance. This determines the degree to which it contributes to power factor correction. This small power factor correction contribution can actually be reduced to zero by modifying the filter 35 in FIG. 3 by the addition of an inductor 48 connected in parallel with the harmonic tuned combination of capacitor 39 and inductor 37, and choosing the inductance of inductor 48 to resonate at the AC power source frequency with the other filter components capacitor 39 and inductor 37. This modified filter is designated 50 in FIG. 5, and has a very high impedance, associated with its parallel resonance condition at power source frequency.

When a pulsed inductive load, in a power factor corrected plant distribution system, tends to stimulate the flow of a harmonic current, the impedance at that harmonic frequency of the system, looking from the load, determines the amplitude of the harmonic current. The system impedance as a function of frequency of the various system circuits is therefore helpful to appreciate at what frequencies, in each system configuration, high harmonic currents can be generated.

Figure 6:
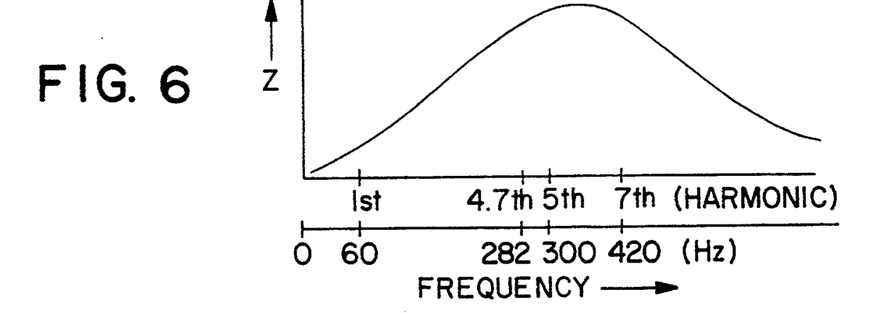
FIG. 6 shows a graph of power distribution-system impedance Z as a function of frequency, as seen from the load looking to the left in the prior art system of FIG. 1.

FIG. 6, corresponding to the prior art system configuration of FIG. 1, shows high system impedance over all of the frequencies of all harmonics of interest, but because the system of FIG. 1 does not have a pulsed inductive load, harmonic currents are not stimulated by pulsed inductive load, and this high impedance is of no consequence.

Figure 7:
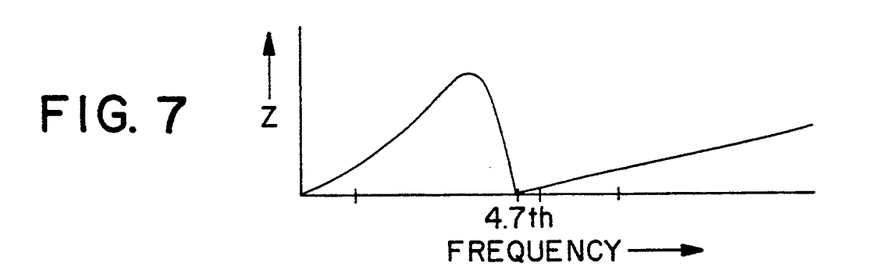
FIG. 7 shows a graph of power distribution-system impedance Z as a function of frequency, as seen from the load looking to the left in the prior art system of FIG. 2.

In FIG. 7, corresponding to the prior art system configuration of FIG. 2, the power distribution system has an essentially zero system impedance at the 4.7th harmonic at which the inductor 30 and power factor correction capacitor are made resonant, and has a finite impedance at exactly the 5th harmonic. Thus some 5th harmonic current will bypass the series tuned circuit and flow in the transformer. This graphically illustrates one aspect of compromise and inefficiency of the system of FIG. 2.

Figure 8:
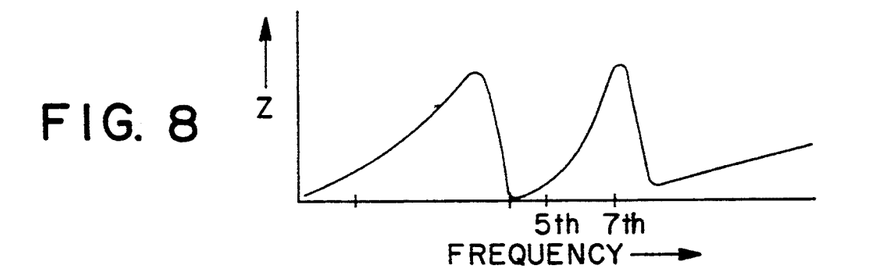
FIG. 8 shows a graph of power distribution-system impedance Z as a function of frequency, as seen from the load looking to the left in the prior art system of FIG. 2 after having been modified by having another power factor correction capacitor connected across the AC distribution conductors.

FIG. 8, corresponds to the system configuration of FIG. 2 modified by the addition of a second power factor correction capacitor (not shown) that may have been added to further correct for an added inductive load (not shown) and thus an additional inductive load current. An essentially zero system impedance exists at the 4.7th harmonic as before, but the added power factor capacitor across the power line will have the serious disadvantage in combination with the capacitor 39 and inductor 37 of also producing a new low impedance point at a frequency higher than the 5th harmonic, and will in combination with the transformer inductance produce a high impedance somewhere near the 7th harmonic. Thus in the case of the prior art system of FIG. 2, it can be dangerous to add a power factor correction capacitor to correct for added inductive load current, whereas in the systems of this invention such upgrading of an existing system is always possible since the filter(s) and the power factor capacitor have separate and essentially independent filtering and power factor correction functions, respectively.

Figure 9:
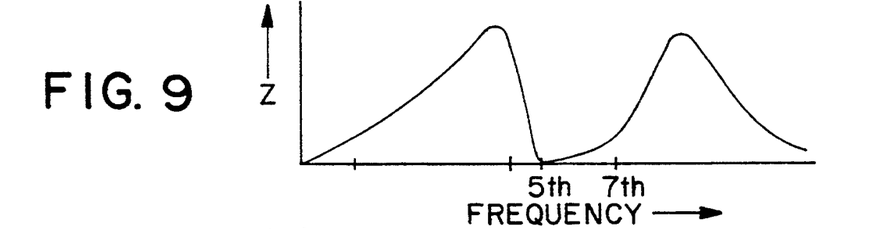
FIG. 9 shows a graph of power distribution-system impedance Z as a function of frequency, as seen from the load looking to the left in the first embodiment of the system of this invention illustrated in FIG. 3.

In FIG. 9, corresponding to the system configuration of FIG. 3, the power distribution system has an essentially zero system impedance at about exactly the 5th harmonic at which the inductor 39 and power factor correction capacitor 37 are made resonant.

Figure 10:
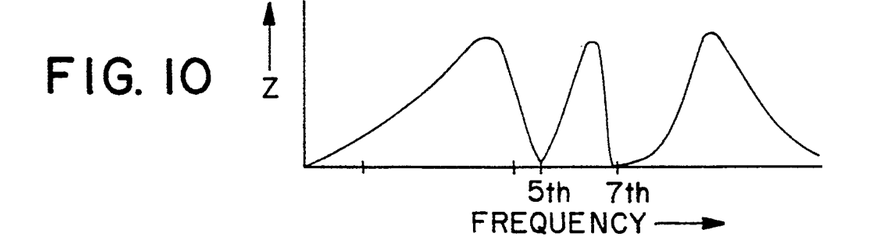
FIG. 10 shows a graph of a power distribution-system impedance Z as a function of frequency, as seen from the load looking to the left in the second embodiment of the system of this invention illustrated in FIG. 4.

In FIG. 10, corresponding to the system configuration of FIG. 4, the power distribution system has an essentially zero system impedance at about exactly the 5th harmonic at which the inductor 39 and power factor correction capacitor 37 are made resonant, and also has an essentially zero system impedance at about exactly the 7th harmonic at which the inductor 44 and power factor correction capacitor 46 are made resonant. Note in contrast, that the system impedance at the 5th and the 7th harmonics in the prior art circuit in FIG. 1, as seen in FIG. 7 and FIG. 8, can be substantially greater at these harmonic frequencies.

Assuming that the ratings of the step-down transformers are the same and the total inductive reactance of the loads in the distribution systems of FIGS. 1, 2 and 3 are all the same, some additional meaningful comparisons can be made as follows. As used herein, the name plate KVAR rating of a capacitor is determined by the formula given above wherein f is the frequency of the voltage of the AC line, namely the source of AC electrical energy. In FIG. 2 the power factor correction capacitor 30 must have a name plate KVAR rating substantially greater than that of power factor correction capacitor 10 in FIG. 1, by as much as a factor of two, because capacitor 30 must be able to operate at a higher voltage than the line voltage, and because capacitor 30 must carry both the power factor correction leading current and the harmonic current. Power-factor-correction capacitor 10 of FIG. 1 and power-factor-correction capacitor 10 of FIG. 3 may be identical for the same system loads.

We claim:

1. An electrical power distribution circuit of an industrial plant or a commercial building, for connecting pulsed inductive loads to an AC source of electrical energy, comprising:
   a) a source of AC electrical energy having a line frequency less than 62 Hz, and providing an essentially sinusoidal voltage;
   b) a voltage step-down transformer rated for a load greater than 500 KVA connected to said AC energy source and having two power output terminals;

c) at least two power conductors connected to said two output terminals of said step-down transformer;
d) one pulsed inductive load connected between said two power conductors;
e) a group of at least one power-factor-correction capacitors each connected directly across said two power conductors; and
f) a first filter comprised of one filter inductor and one filter capacitor connected in series and forming a resonant series circuit connected directly across said two power conductors, the resonant frequency of said first filter being about exactly that of one harmonic of the frequency of said AC source, the impedance of said first filter being essentially zero at the one harmonic frequency so that essentially all of the harmonic current at the one harmonic frequency is shunted through said first filter.

2. The power distribution circuit of claim 1 wherein said one harmonic is at a frequency within the range of the fifth through the thirteenth harmonic of the AC source frequency.

3. The power distribution circuit of claim 1 wherein said group of capacitors constants of one power-factor-correction capacitor.

4. The power distribution circuit of claim 1 wherein said resonant frequency of said first filter is within 2% of the one harmonic of the AC source frequency.

5. The power distribution circuit of claim 1 wherein said one filter capacitor has a name plate KVAR rating that is less than ten percent of the KVA rating of said step-down transformer.

6. The power distribution circuit of claim 1 wherein the safe KVAR carrying capacity of said one filter capacitor at the harmonic frequency to which said first filter is resonant, is more than 300% greater than the name plate KVAR rating of said one filter capacitor.

7. The power distribution circuit of claim 1 wherein said first filter additionally comprises another filter inductor connected in parallel with said series-connected one filter capacitor and one filter inductor, said another filter inductor having an inductance that resonates and produces a high filter impedance at the AC source frequency with said series-connected one filter capacitor and one filter inductor, so that said one filter has an impedance maximum at the AC source frequency and said one filter capacitor provides essentially no power factor correction in said power distribution circuit.

8. The power distribution circuit of claim 1 additionally comprising a second filter comprised of a second filter inductor and a second filter capacitor connected in series across said two power conductors, the resonant frequency of said second filter being that of another harmonic of the AC source frequency.

9. The power distribution circuit of claim 8 wherein the one harmonic frequency at which said first filter is resonant and the another harmonic frequency at which said second filter is resonant are respectively the fifth and the seventh harmonics of said AC power source frequency.

10. The power distribution circuit of claim 8 wherein the one harmonic frequency at which said first filter is resonant and the another harmonic frequency at which said second filter is resonant are respectively the eleventh and thirteenth harmonics of said AC power source frequency.

* * * * *

UNITED STATES PATENT AND TRADEMARK OFFICE
CERTIFICATE OF CORRECTION

PATENT NO. : 5,387 821
DATED      : February 7, 1995
INVENTOR(S): Paul B. Steciuk, Frank W. Smith and Carol A. Lupo It is certified that error appears in the above-identified patent and that said Letters Patent is hereby corrected as shown below:

On the title page, item:
    [73] Assignee Allegro Microsystems, Inc." to
- - [73] Assignee  Commonwealth Sprague Capacitor, Inc. - -

Signed and Sealed this

Twentieth Day of June, 1995

Attest:

BRUCE LEHMAN

Attesting Officer

Commissioner of Patents and Trademarks